(12) United States Patent
Siddiqui et al.

(10) Patent No.: US 9,857,849 B1
(45) Date of Patent: Jan. 2, 2018

(54) HINGED DEVICE WITH WRAPPED DISPLAYS

(71) Applicant: Microsoft Technology Licensing, LLC, Redmond, WA (US)

(72) Inventors: Kabir Siddiqui, Sammamish, WA (US); Karsten Aagaard, Monroe, WA (US); Anthony C. Reed, Bellevue, WA (US); Benoit Guillaume Henri Rouger, Woodinville, WA (US); Ying Zheng, Sammamish, WA (US); Errol M. Tazbaz, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/299,277

(22) Filed: Oct. 20, 2016

Related U.S. Application Data

(60) Provisional application No. 62/348,784, filed on Jun. 10, 2016.

(51) Int. Cl.
*G06F 1/16* (2006.01)

(52) U.S. Cl.
CPC .......... *G06F 1/1681* (2013.01); *G06F 1/1616* (2013.01); *G06F 1/1647* (2013.01)

(58) Field of Classification Search
None
See application file for complete search history.

(56) References Cited

U.S. PATENT DOCUMENTS

| | | | |
|---|---|---|---|
| 4,493,316 A | 1/1985 | Reed et al. | |
| 4,996,739 A | 3/1991 | Baer | |
| 5,987,704 A | 11/1999 | Tang | |
| 6,262,785 B1 * | 7/2001 | Kim | G06F 1/1601 345/903 |

(Continued)

FOREIGN PATENT DOCUMENTS

| | | |
|---|---|---|
| WO | 2010076639 A2 | 7/2010 |
| WO | 2010093139 A3 | 10/2010 |

OTHER PUBLICATIONS

Martin, Harlan, "Geared Hinge", published on Jan. 27, 2015, retrieved at <<http://www.thingiverse.com/make:116451>> on Sep. 19, 2016, 3 pages.

(Continued)

*Primary Examiner* — Lisa Lea Edmonds
(74) *Attorney, Agent, or Firm* — Rainier Patents, P.S.

(57) ABSTRACT

The description relates to hinged devices, such as hinged computing devices. One example can include a first portion and a second portion. The example can also include a pair of self-regulating hinge assemblies rotatably securing hinge ends of the first and second portions around a first hinge axis associated with the first portion and a second hinge axis associated with the second hinge axis so that an extent of rotation around the first hinge axis corresponds to an extent of rotation around the second hinge axis. The example can also include a first display positioned on the first portion and wrapped around the hinge end between the pair of self-regulating hinge assemblies. The example can further include a second display positioned on the second portion and wrapped around the hinge end between the pair of self-regulating hinge assemblies.

20 Claims, 16 Drawing Sheets

(56) References Cited

U.S. PATENT DOCUMENTS

| | | | | |
|---|---|---|---|---|
| 8,493,730 | B2* | 7/2013 | Shim | G06F 1/1615 16/321 |
| 8,522,401 | B2 | 9/2013 | Jin et al. | |
| 8,867,200 | B2* | 10/2014 | Suzuki | G06F 1/1616 345/1.3 |
| 8,928,552 | B2* | 1/2015 | Aono | G06F 1/1616 345/1.1 |
| 8,971,029 | B2* | 3/2015 | Wong | G06F 1/1641 292/341.17 |
| 8,982,542 | B2* | 3/2015 | Bohn | G06F 1/1618 361/679.06 |
| 9,235,239 | B2* | 1/2016 | van Dijk | G06F 1/1652 |
| 9,312,633 | B1* | 4/2016 | Szeto | H01R 13/6205 |
| 9,411,365 | B1 | 8/2016 | Tanner et al. | |
| 9,541,962 | B2* | 1/2017 | Siddiqui | G06F 1/1618 |
| 2005/0122671 | A1 | 6/2005 | Homer | |
| 2005/0239520 | A1 | 10/2005 | Stefansen | |
| 2006/0007648 | A1 | 1/2006 | Wang | |
| 2009/0070961 | A1 | 3/2009 | Chung et al. | |
| 2012/0113614 | A1 | 5/2012 | Watanabe | |
| 2012/0120618 | A1 | 5/2012 | Bohn | |
| 2013/0016489 | A1 | 1/2013 | Yeh et al. | |
| 2013/0111704 | A1 | 5/2013 | Mitsui | |
| 2013/0139355 | A1 | 6/2013 | Lee et al. | |
| 2013/0152342 | A1 | 6/2013 | Ahn et al. | |
| 2013/0322004 | A1 | 12/2013 | Park | |
| 2015/0184437 | A1 | 7/2015 | Wikander et al. | |
| 2015/0241925 | A1 | 8/2015 | Seo et al. | |
| 2015/0267450 | A1 | 9/2015 | Chiang | |
| 2015/0345195 | A1 | 12/2015 | Park | |
| 2016/0070310 | A1 | 3/2016 | Holung et al. | |
| 2016/0143162 | A1* | 5/2016 | Van Dijk | G06F 1/1652 361/679.01 |
| 2016/0187934 | A1 | 6/2016 | Lee et al. | |
| 2017/0038641 | A1* | 2/2017 | Yamazaki | G02F 1/133555 |
| 2017/0145725 | A1* | 5/2017 | Siddiqui | E05F 3/20 |

OTHER PUBLICATIONS

"Double Geared Hinge 3D Print Model", published on Feb. 20, 2014, retrieved at <<http://www.wamungo.com/PrintModel/Detail/Double-geared-hinge-5305a74589702816c05d1ab5>> on Sep. 23, 2016, 4 pages.

"Acer Unveils Industry's First Convertible Chromebook with 13-inch Display," published on Aug. 31, 2016, retrieved at <<http://www.acer.com/ac/en/US/press/2016/202372>> on Nov. 18, 2016, 2 pages.

"International Search Report and Written Opinion Issued in PCT Application No. PCT/US2017/035568", dated Sep. 25, 2017, 11 Pages.

* cited by examiner

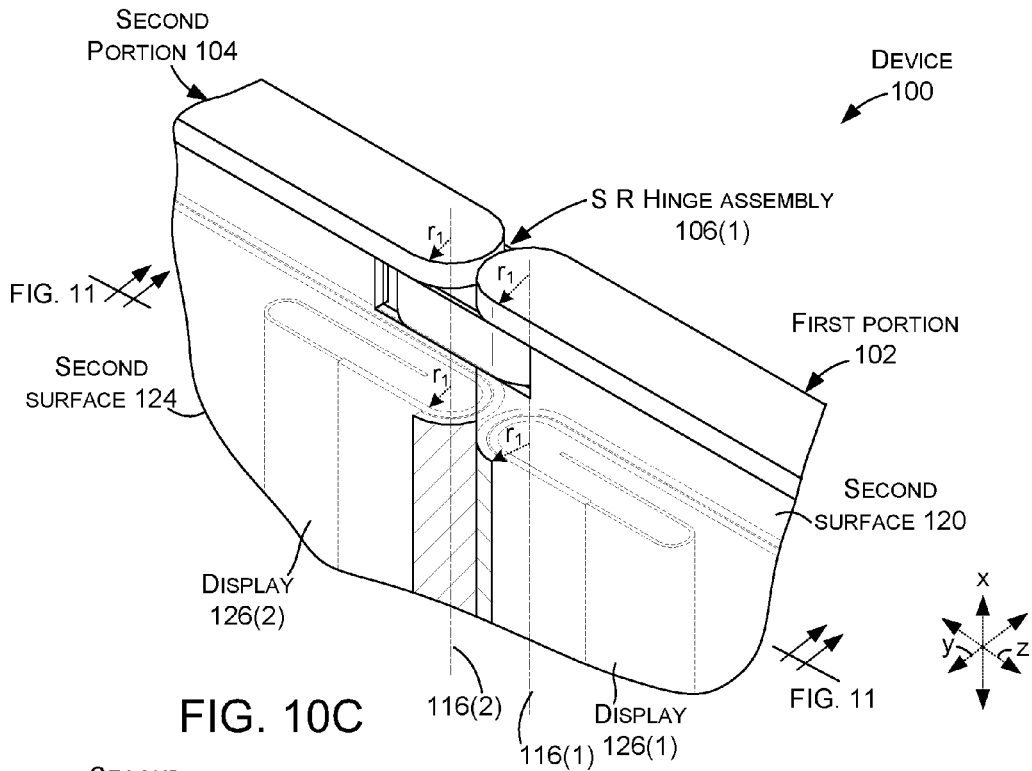
FIG. 10C
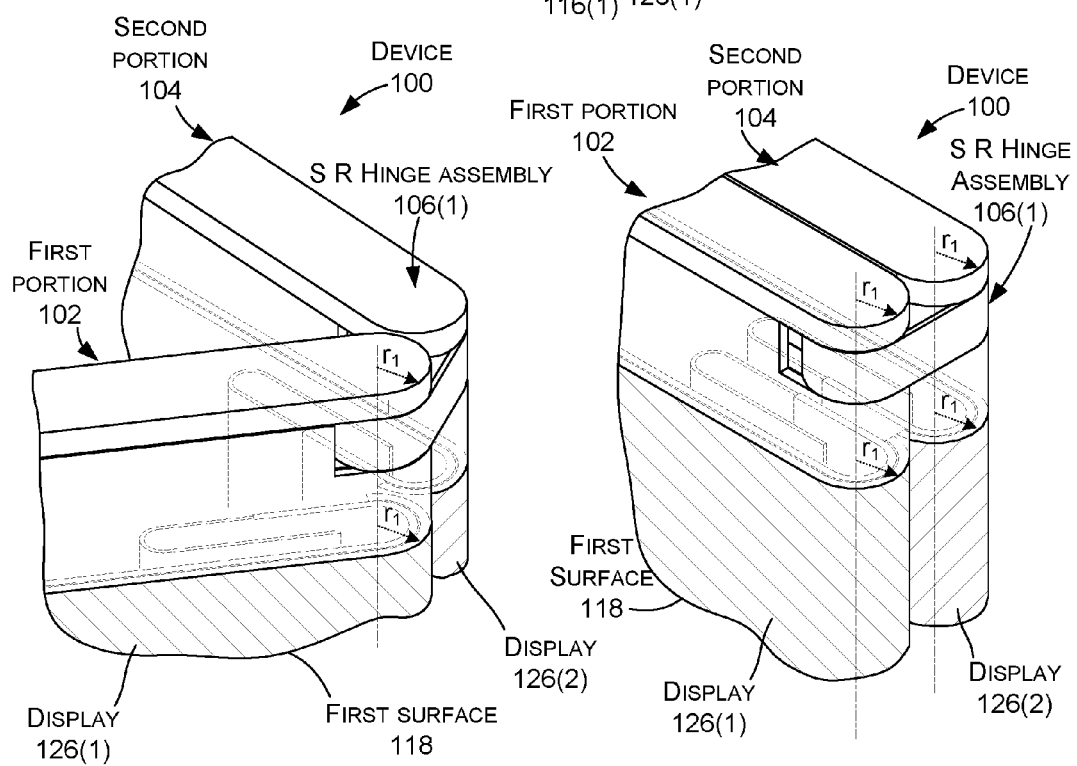
FIG. 10D
FIG. 10E

HINGED DEVICE WITH WRAPPED DISPLAYS

PRIORITY

This utility application claim priority from U.S. Provisional Application 62/348,784, filed on Jun. 10, 2016, which is incorporated by reference in its entirety.

BRIEF DESCRIPTION OF THE DRAWINGS

The accompanying drawings illustrate implementations of the concepts conveyed in the present document. Features of the illustrated implementations can be more readily understood by reference to the following description taken in conjunction with the accompanying drawings. Like reference numbers in the various drawings are used wherever feasible to indicate like elements. Further, the left-most numeral of each reference number conveys the FIG. and associated discussion where the reference number is first introduced.

FIGS. 1, 2A-2D, 3A, 4A-4B, 5A-5B, 6A-6B, 7A-7B, 8A-8B, 9A-9B, and 10A-10E show perspective views of example devices in accordance with some implementations of the present concepts.

DESCRIPTION

The present concepts relate to devices, such as computing devices employing hinge assemblies that can rotationally secure first and second device portions relative to a first hinge axis that relates to the first portion and a second hinge axis that relates to the second portion. From one perspective, some of the present hinge assemblies can be viewed as being 'self-regulating' in that rotation is controlled so that an extent of rotation around the first hinge axis corresponds to an extent of rotation around the second hinge axis.

Figure 1:
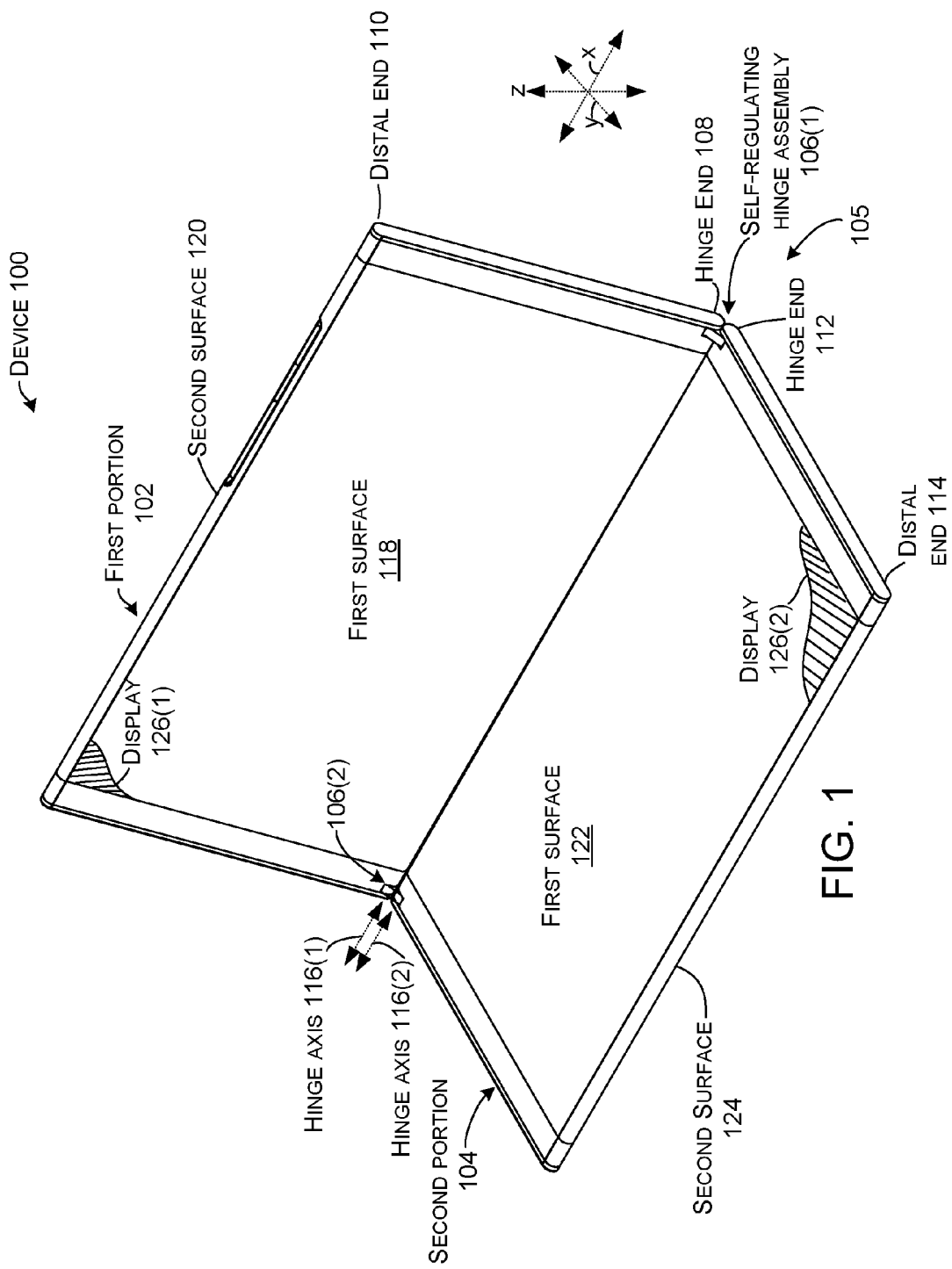

Introductory FIG. 1 shows an example device 100 that has first and second portions 102 and 104 that are rotatably secured together by a hinge assembly 105, which in this case is manifest as a pair of a self-regulating hinge assemblies 106.

The first portion 102 can extend from a hinge end 108 to a distal end 110. The second portion 104 also can extend from a hinge end 112 to a distal end 114. The hinge assembly 105 can define two hinge axes 116. The first portion 102 can rotate around first hinge axis 116(1) and the second portion 104 can rotate around second hinge axis 116(2). The first portion 102 can include opposing first and second major surfaces 118 and 120 (hereinafter, first and second surfaces). Similarly, the second portion 104 can include opposing first and second major surfaces 122 and 124 (hereinafter, first and second surfaces). (Note the second surfaces 120 and 124 are facing away from the viewer and as such are not directly visible in this view, but are shown and designated in subsequent FIGS.).

In some implementations, displays 126 can be positioned on the first and/or second surfaces. In this case, displays 126(1) and 126(2) are interposed between the self-regulating hinge assemblies 106(1) and 106(2). In the illustrated configuration, the displays 126 are positioned on first surfaces 118 and 122, respectively and curve or wrap around hinge ends 108 and 112 between self-regulating hinge assemblies 106(1) and 106(2) onto second surfaces 120 and 124, respectively. Thus, from one perspective, the displays are interposed in that the self-regulating hinge assemblies 106 are positioned at the extremes of the first and second portions and the displays extend between them on the first surfaces and wrap around to the second surfaces between the self-regulating hinge assemblies 106.

Figure 2A:
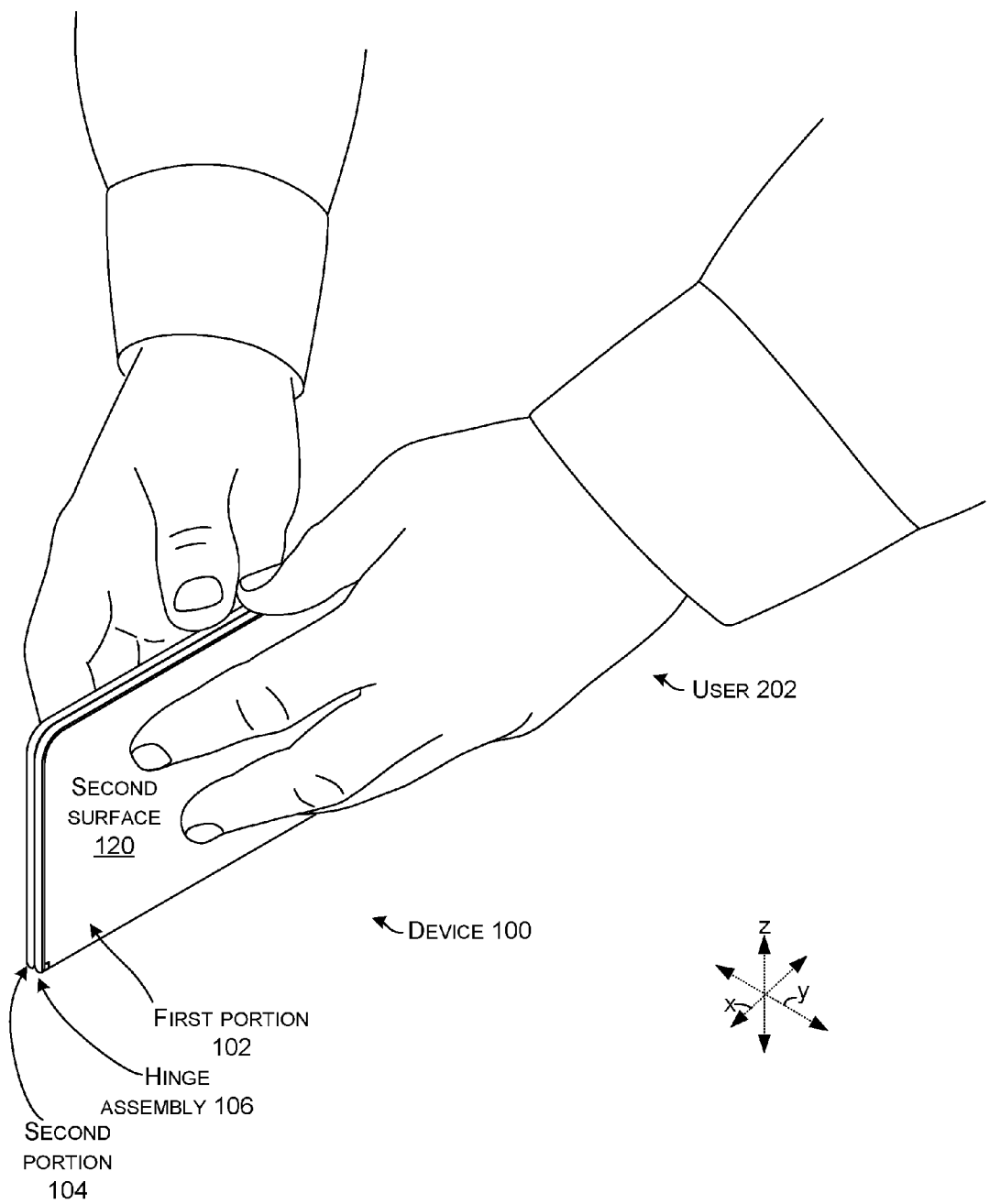

FIGS. 2A-2D collectively show a use case scenario of device 100. FIG. 2A starts with device 100 in the closed orientation where the first and second portions 102 and 104 are positioned against one another and are rotatably secured by hinge assembly 105. In this case, the second surfaces are facing outwardly with the first portion's second surface 120 facing the reader and the first surfaces (designated in FIG. 2B) facing inwardly. The closed orientation can be very compact and easy for the user 202 to transport. For instance, the device may fit in the user's pocket. Further, the first surfaces can be protected in this closed orientation by the second surfaces. The device can be biased to maintain this orientation until acted upon by the user. At this point user 202 is starting to open the device 100 (e.g., rotate the device portions 102 and 104 away from one another).

Figure 2B:
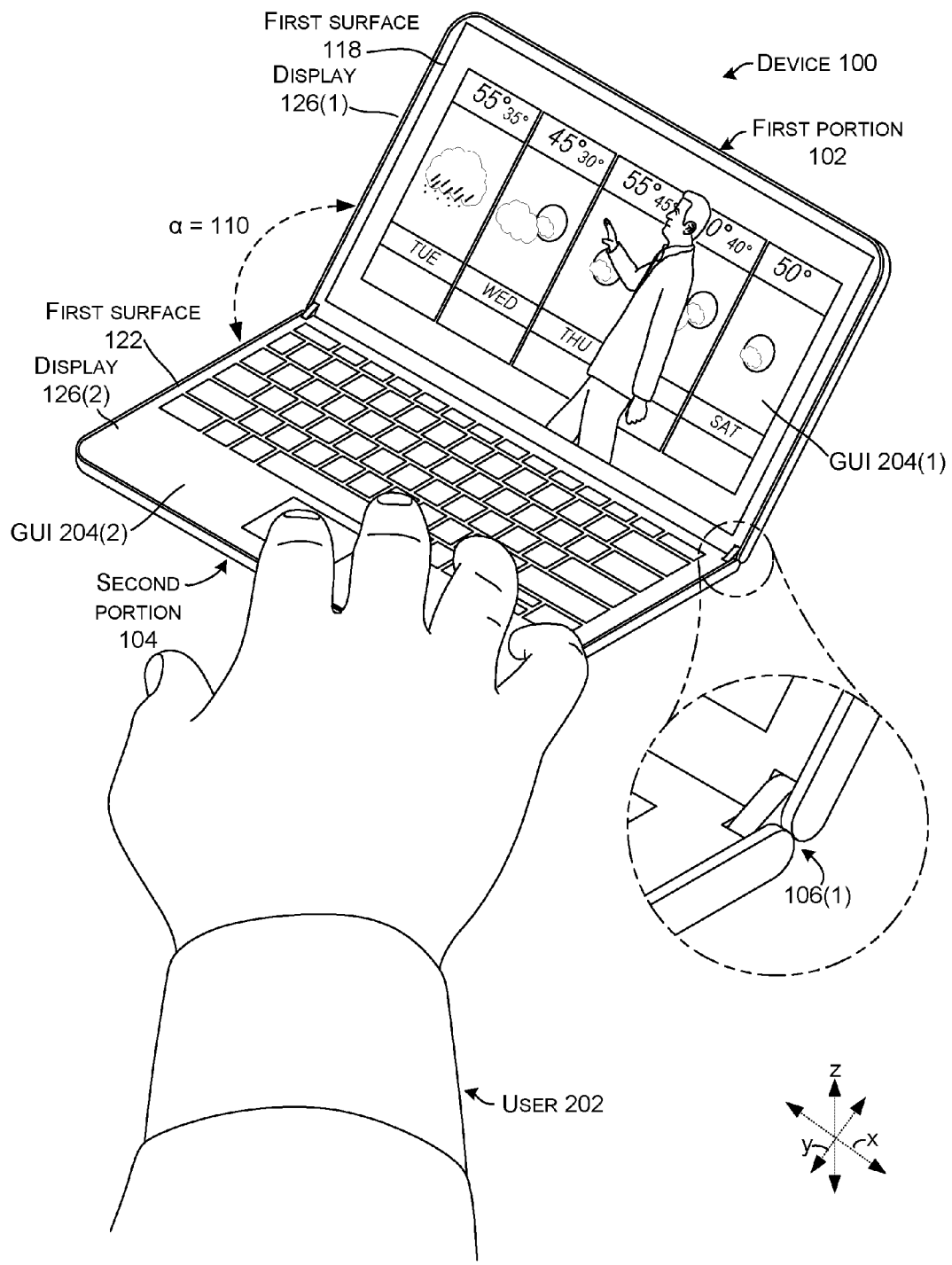

FIG. 2B shows the device 100 opened to an angle α defined between the first and second portions 102 and 104 of about 110 degrees. This orientation can be thought of as a 'notebook' or 'laptop' orientation. The notebook orientation can be manifest as an angle in a range from about 90 degrees to about 150 degrees. In this case, the device portions 102 and 104 are configured to maintain this relative orientation while the user 202 uses the device. In this example, video content is presented on a GUI 204(1) on display 126(1) of the first portion 102 and a virtual keyboard is presented on display 126(2) on second portion 104. The user can control GUI 204(1) via the virtual keyboard of GUI 204(2).

Figure 2C:
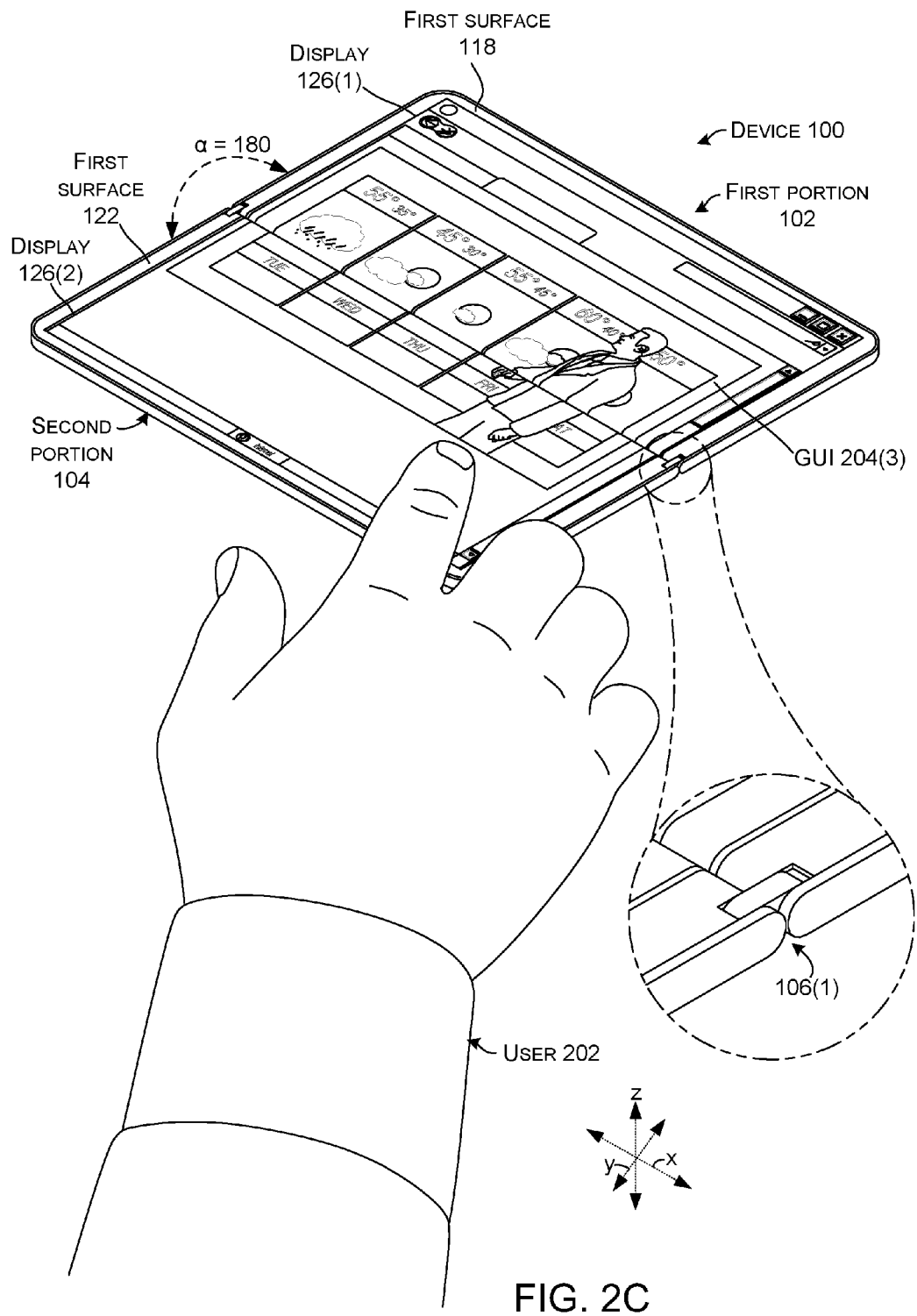

FIG. 2C shows the device 100 rotated until the relative angle α is about 180 degrees between the first and second portions 102 and 104. In this orientation, a single GUI 204(3) can be presented collectively across displays 126(1) and 126(2). This GUI 204(3) offers basically twice the display area of either device portion 102 or 104. The device can be biased to maintain this fully open orientation for viewing, yet when not utilized by the user 202, the user can close the device 100 to a compact easy to carry configuration (e.g., see FIG. 2A) that protects the displays 126 from damage.

Figure 2D:
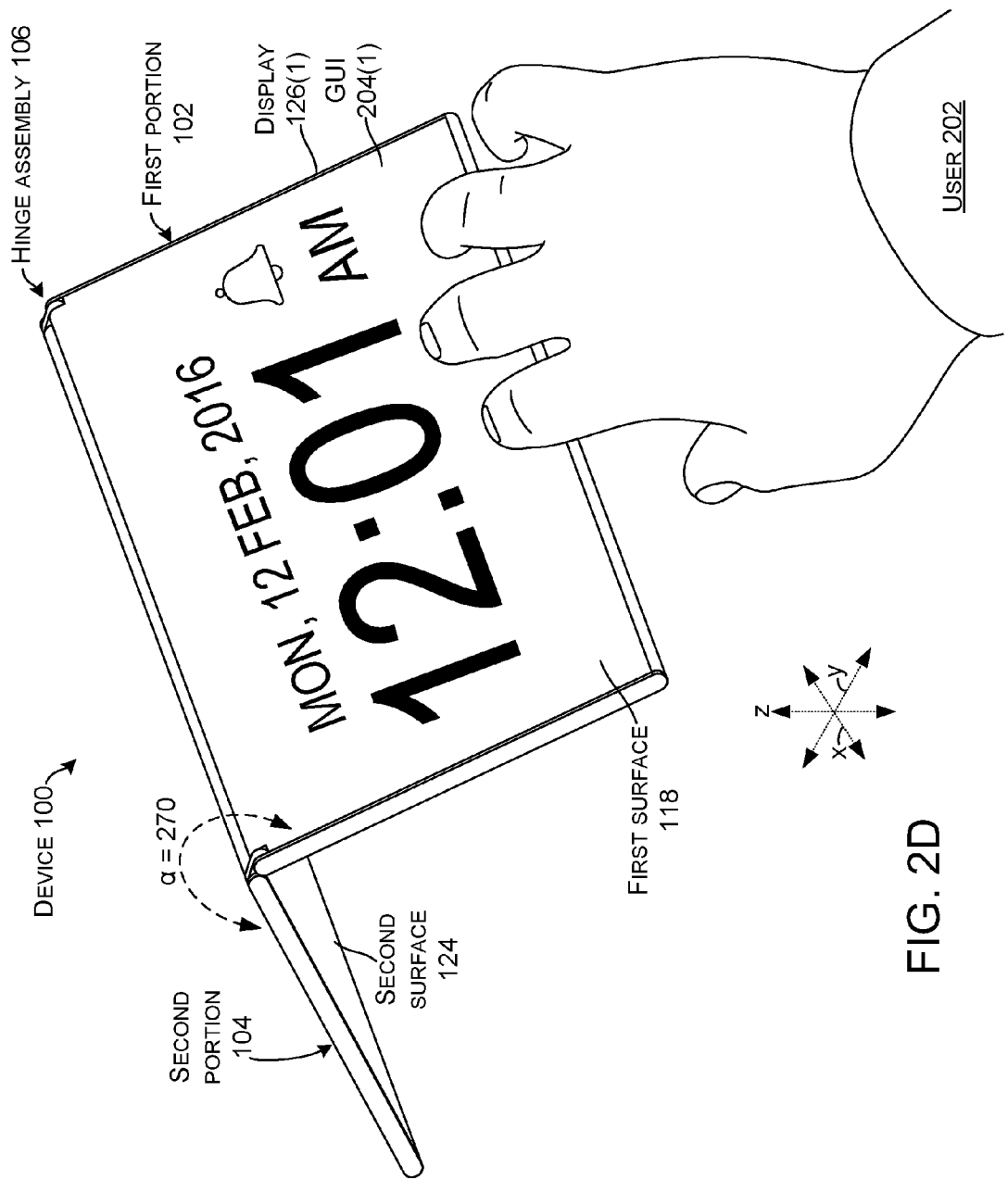

FIG. 2D shows another orientation where the angle α is about 270 degrees (or in a range from about 240 degrees to about 330 degrees). This orientation can be thought of as an 'alarm clock' orientation where the device stands on its own and the displays 126 are readily visible to the user.

Note that while obscured by the displays 126, several electronic components, such as circuit boards, processors, and/or storage/memory can be secured to the first and second portions 102 and/or 104.

The processor can generate GUIs 204 for presentation on the displays 126. In some implementations, the processor may generate different GUIs for the displays when the first and second portions 102 and 104 are in some orientations and a single GUI for a combined presentation in other orientations. For instance, when the first and second portions are oriented at 90 degrees relative to one another, the processor may generate a first GUI for presentation on the first portion and a second GUI for presentation on the second portion. When the first and second portions are oriented to 180 degrees, the processor can generate a single GUI that is collectively presented across both displays to create a larger display area. In other orientations, such as the alarm clock orientation, the same GUI may be presented on both the first and second portions. For instance, the time could be presented on both portions so that it is visible from more positions around the device.

Stated another way, in some configurations, the first surfaces 118 and 122 can be manifest as displays 126, such that in the fully open orientation of FIG. 2C the displays can work cooperatively to create a larger (e.g., 2x) display area. In some cases, the second surfaces 120 and 124 can be manifest as protective covers so that in the orientation of FIG. 2A the protective covers protect the displays of the first surfaces. In other configurations, both the first and second surfaces can include displays, or neither can include displays.

Figure 3A:
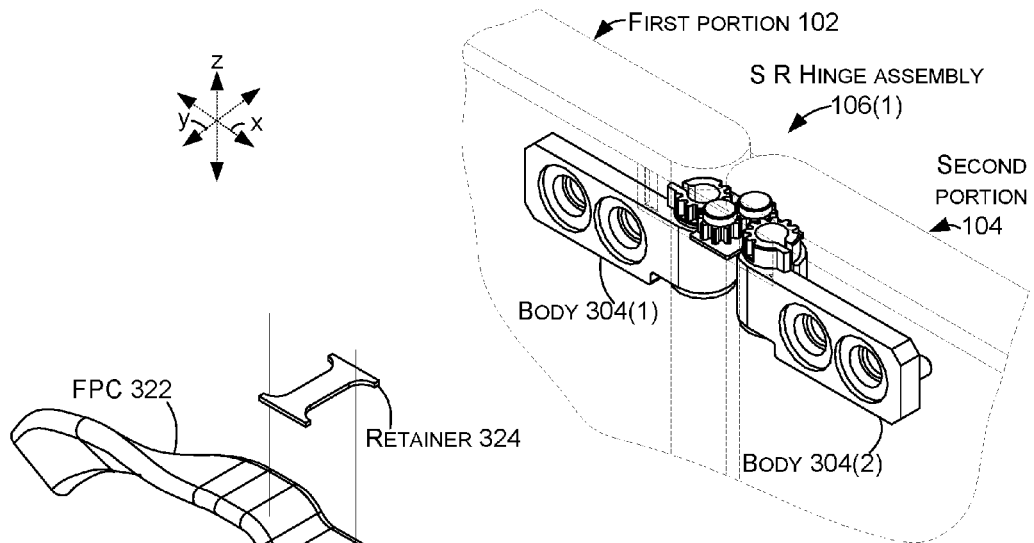
Figure 3B:
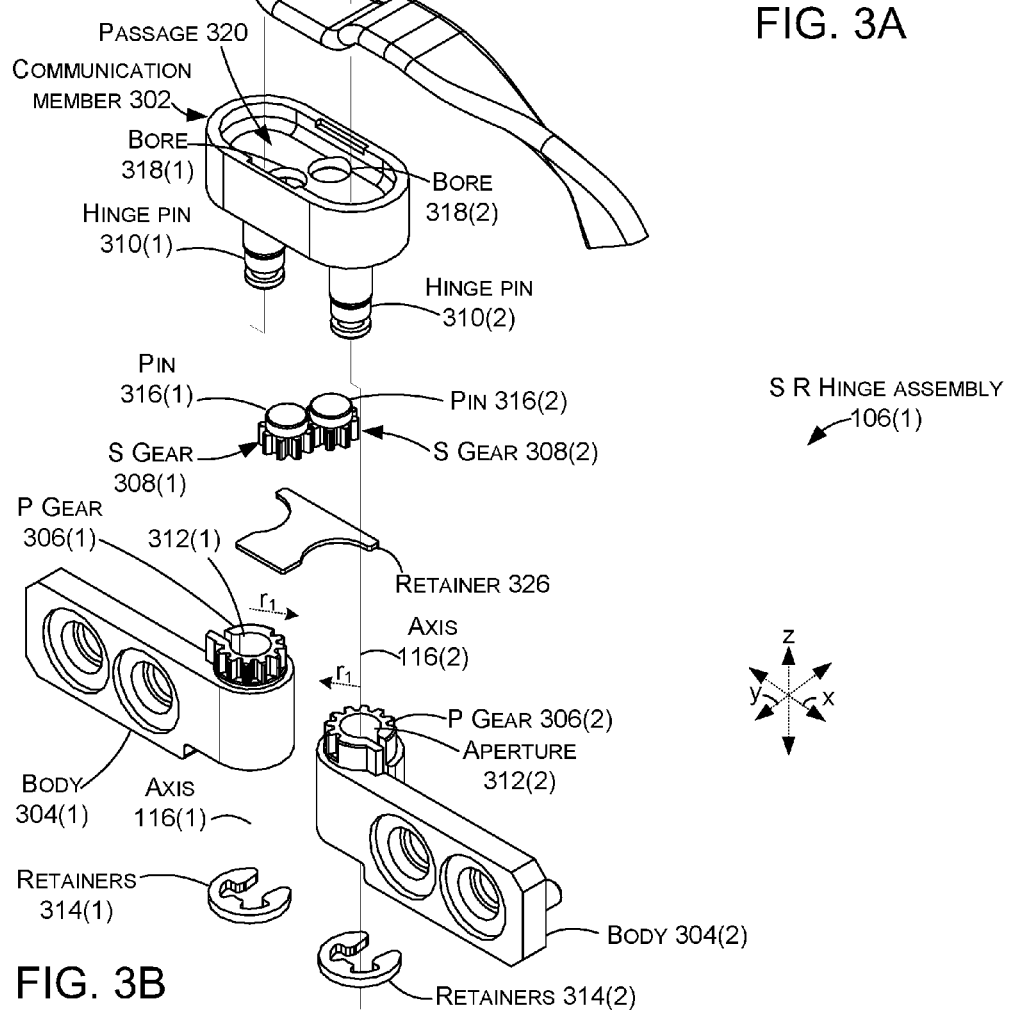
FIGS. 3B and 3C show exploded perspective views of example devices in accordance with some implementations of the present concepts.
Figure 3C:
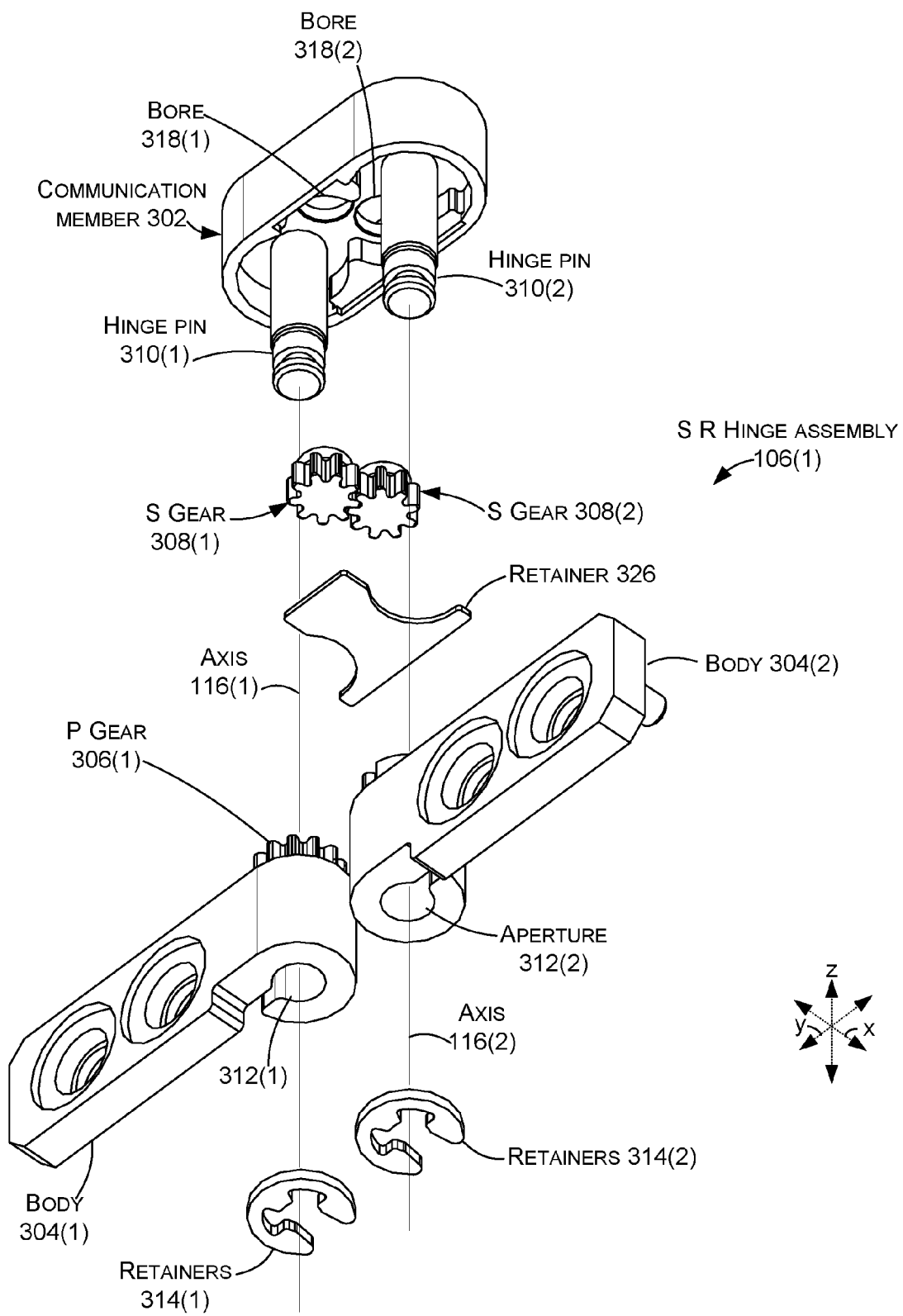

FIGS. 3A-3C collectively show more details of example self-regulating hinge assembly 106(1). The self-regulating hinge assembly 106(1) can include a communication member 302 (not shown in FIG. 3A) and first and second hinge bodies 304(1) and 304(2). The hinge bodies can define primary gears 306 that can interact with intervening or secondary gears 308. The hinge bodies can also have a curved shape (e.g., radius of curvature $r_1$) around the axes 116 that can facilitate rotation of the hinges. This aspect will be discussed in more detail below relative to FIGS. 10A-10E.

The communication member 302 can include hinge pins 310 that pass through the primary gears 306 and apertures 312 in the first and second bodies 304. In some implementations, the apertures 312 can be sized so the that the bodies 304 act as friction cylinders for the hinge pins 310 (e.g., provide a degree of frictional resistance that can hold the portions in an existing orientation unless acted upon by the user). Retainers 314 can secure the hinge pins 310 with the first and second bodies 304. The communication member 302 can also be configured to secure the secondary gears 308 in engagement with the primary gears 306. In this example, the secondary gears 308 include protuberances or pins 316 that are received by bores 318 in the communication member 302 to retain the secondary gears in engaging relation with each other and the primary gears.

The communication member 302 can also define a passage 320 configured to receive a conductor, such as a flexible printed circuit (FPC) 322. The conductor can connect displays and/or other electronic components on the first portion with displays and/or other electronic components on the second portion. A retainer 324 can maintain the FPC in the communication member 302. Similarly, a retainer 326 can retain secondary gears 308 in the communication member 302.

Figure 4A:
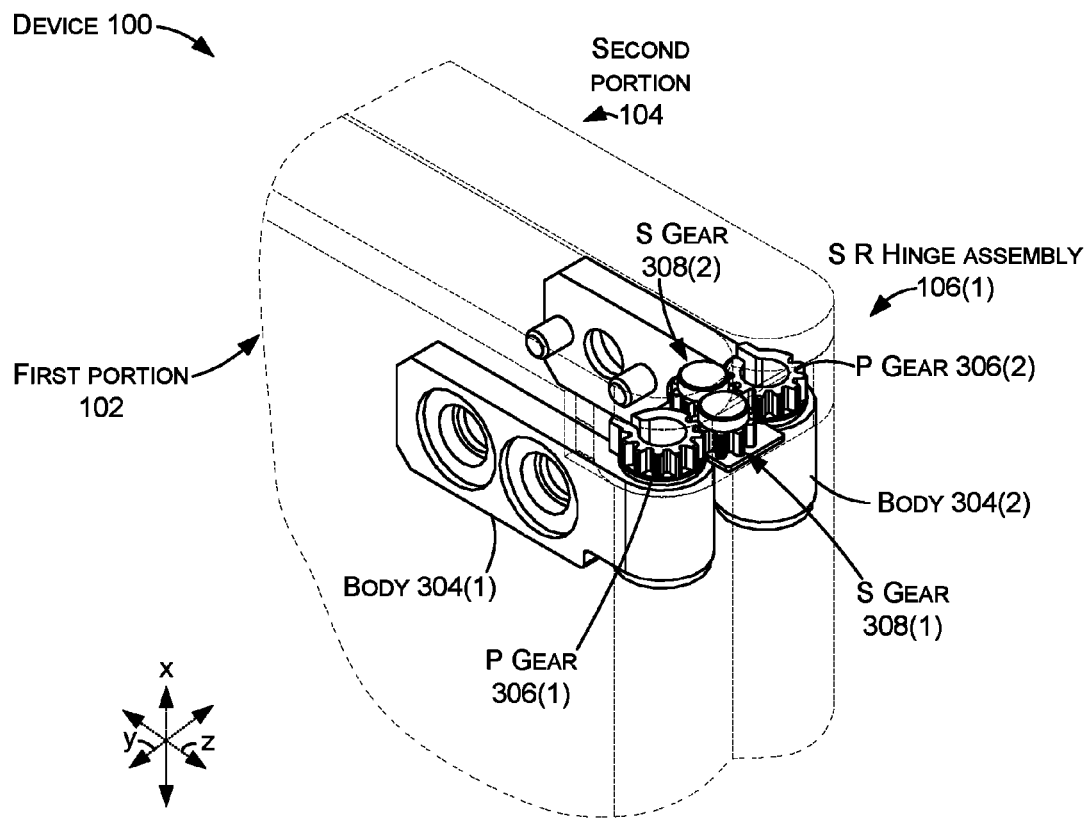
Figure 6A:
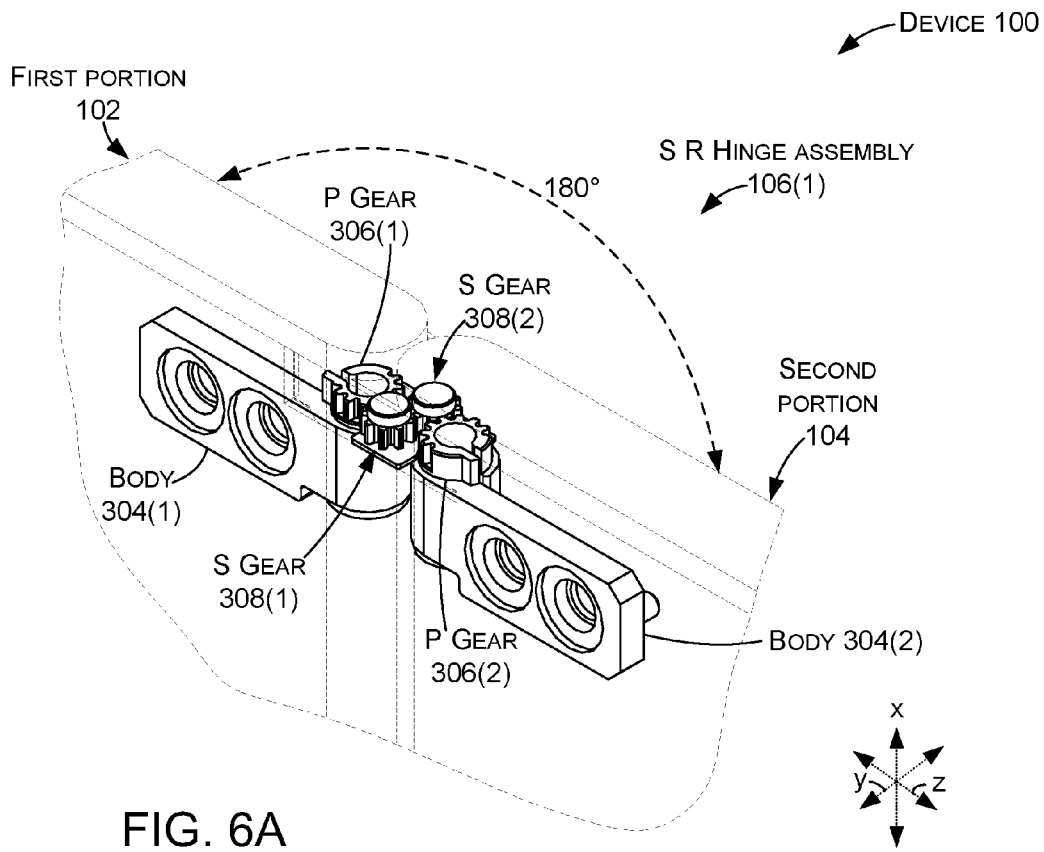
Figure 6B:
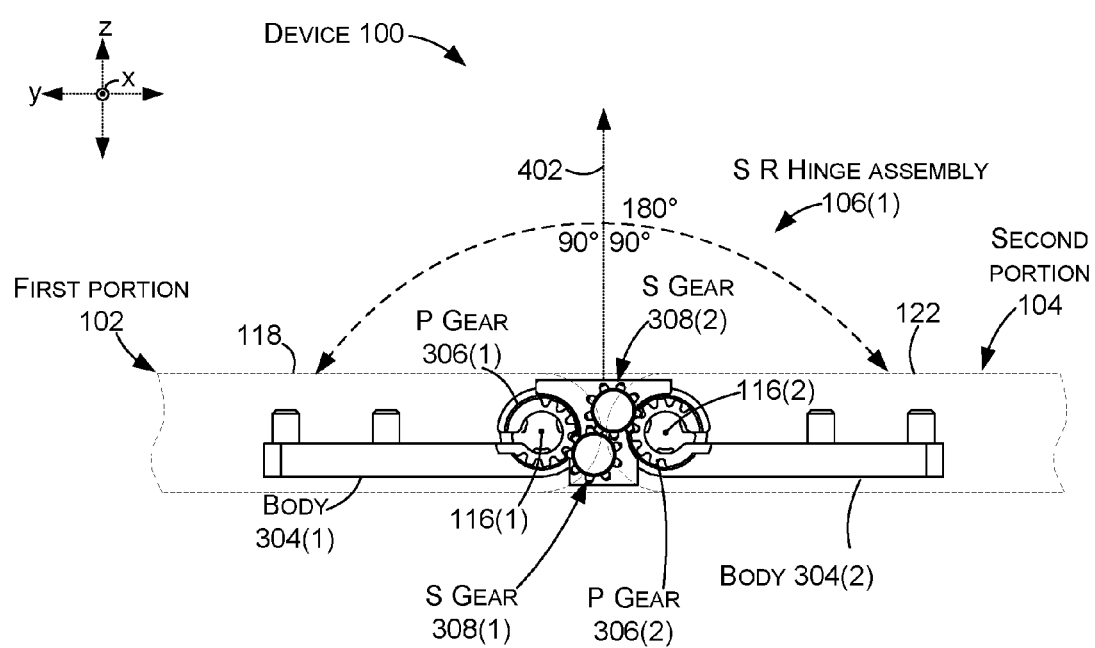
Figure 7A:
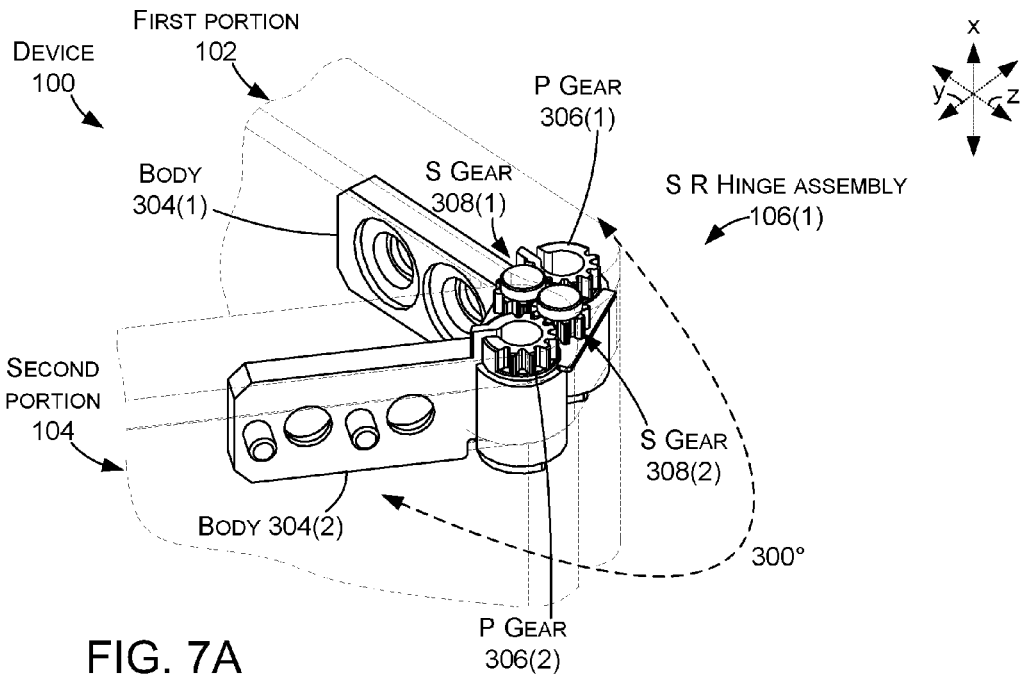
Figure 7B:
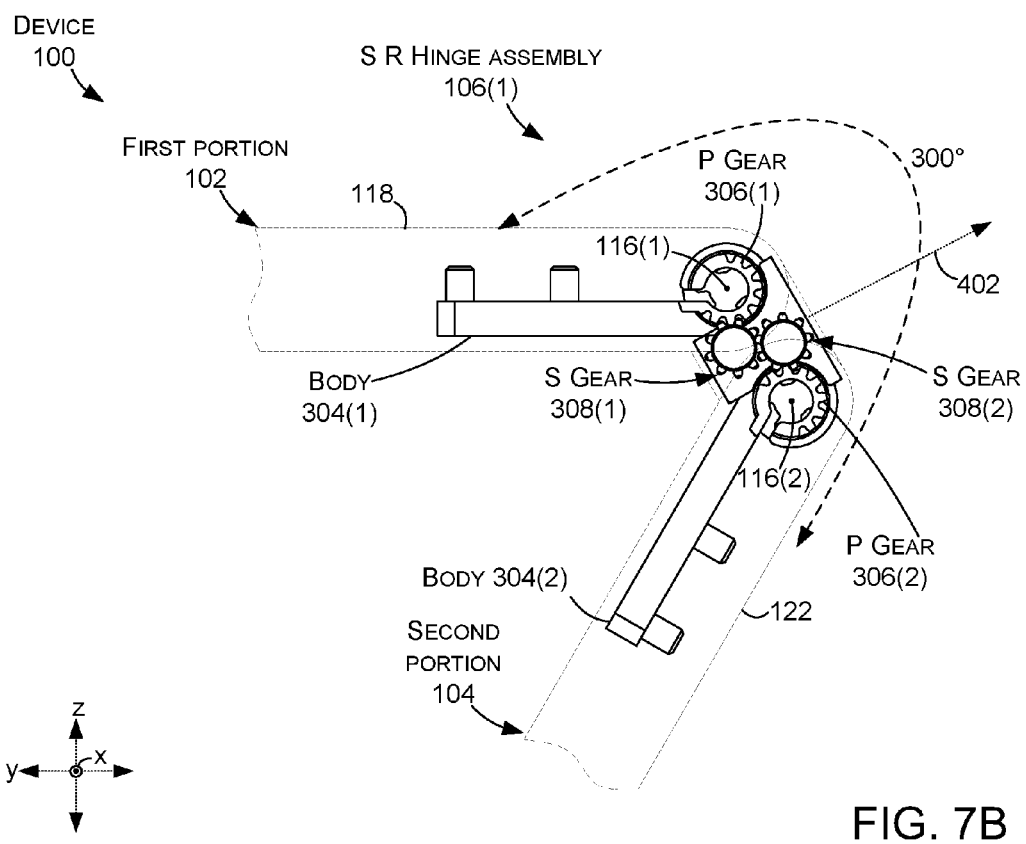
Figure 8A:
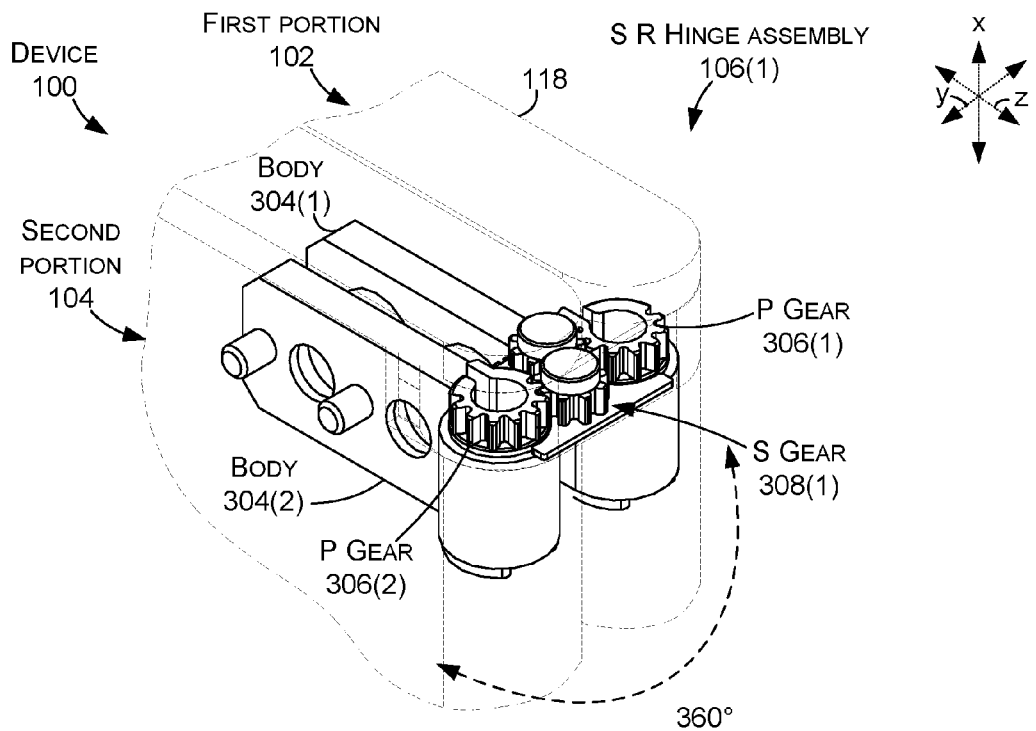
Figure 8B:
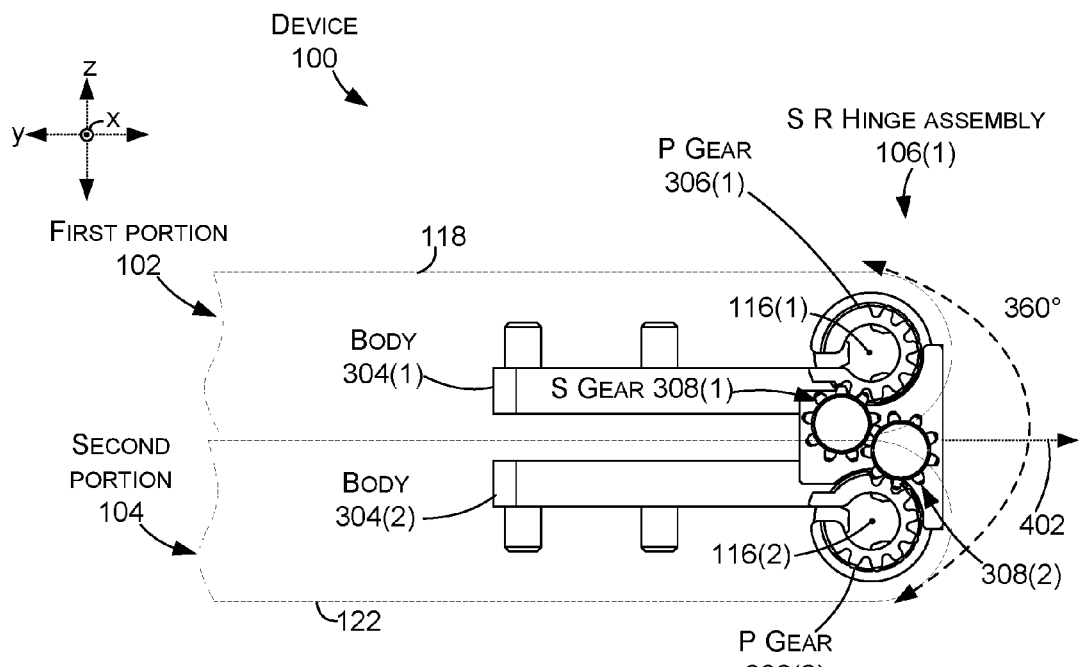

FIGS. 4A-8B collectively show operation of the self-regulating hinge assembly 106(1) of device 100. FIGS. 4A and 4B show the first and second portions 102 and 104 at zero degrees relative to one another. FIGS. 5A and 5B show the first and second portions at 90 degrees of relative rotation. FIGS. 6A and 6B show the first and second portions at 180 degrees of relative rotation. FIGS. 7A and 7B show the first and second portions at 300 degrees of relative rotation. FIGS. 8A and 8B show the first and second portions at 360 degrees of relative rotation.

Figure 4B:
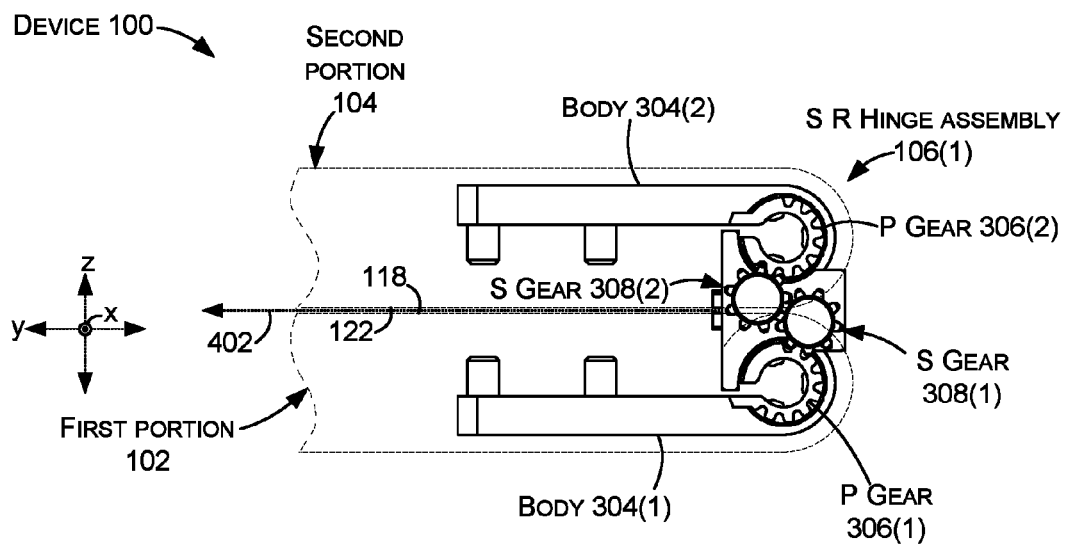

FIGS. 4A-4B show the device 100 in the closed positioned with the first and second portions 102 and 104 against one another such that first surfaces 118 and 122 are parallel to and opposing one another. The first and second surfaces 118 and 122 are also parallel to a reference line 402. The relevance of reference line 402 will be explained below relative to FIGS. 5A-8B.

Figure 5A:
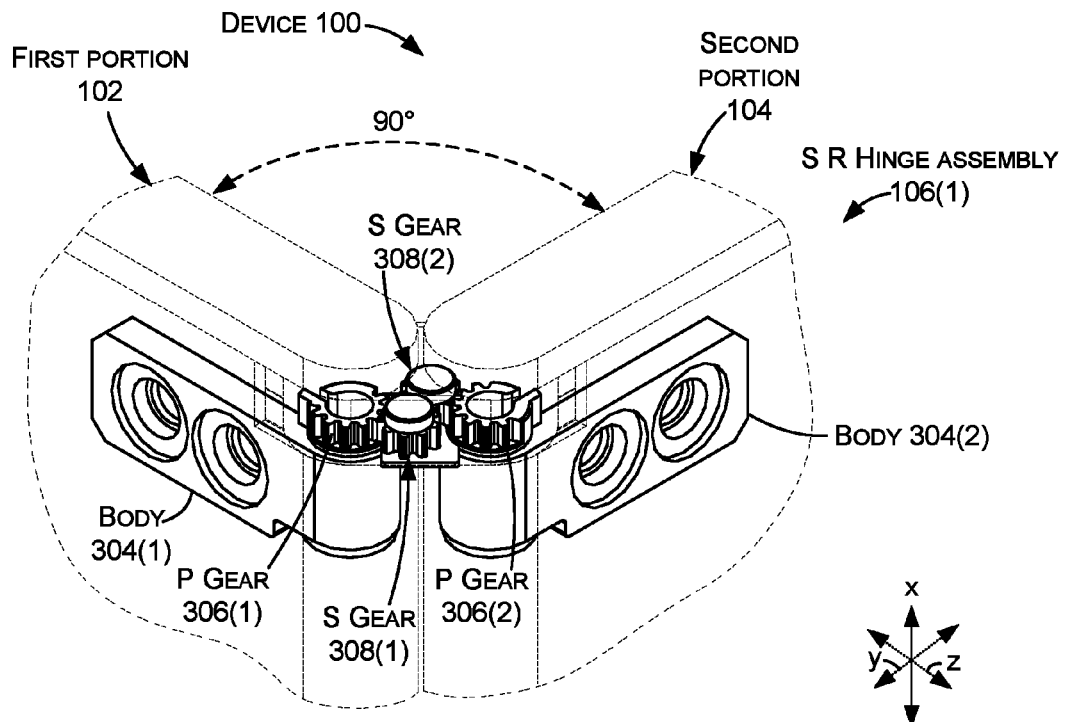
Figure 5B:
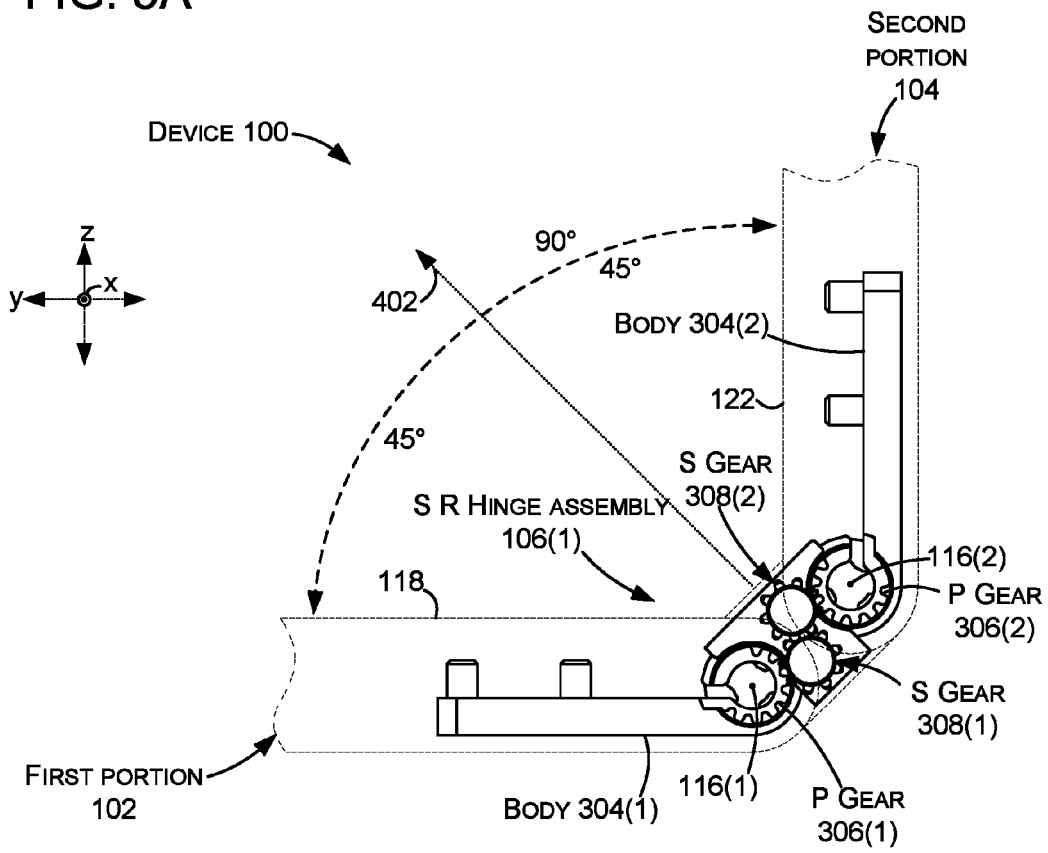

FIGS. 5A and 5B show the device 100 opened until the first and second portion are oriented about 90 degrees from one another (as measured relative to first surfaces 118 and 122). Note also, that gear interaction ensures that rotation around one hinge axis 116 causes a corresponding amount of rotation in the other hinge axis 116. In this example, the corresponding rotation is one-to-one, such that 45 degrees of rotation around hinge axis 116(1) accompanies 45 degrees of rotation around hinge axis 116(2). In the illustrated configuration, primary gear 306(1) is positioned around hinge axis 116(1) and interacts in a timed manner with secondary gear 308(1). The secondary gear 308(1) interacts in a timed manner with secondary gear 308(2). The secondary gear 308(2) interacts in a timed manner with primary gear 306(2), which is positioned around hinge axis 116(2). As such, a degree of rotation of first portion 102 around hinge axis 116(1) produces a corresponding rotation of second portion 104 around hinge axis 116(2). Thus, from one perspective the self-regulating hinge assemblies can control the extent and/or timing of rotation around the two hinge axes 116.

FIGS. 6A and 6B show the device 100 with the device portions rotated to 180 degrees. In this implementation the self-regulating hinge assembly 106(1) causes the 180 degrees of rotation to be achieved by 90 degrees of rotation by first portion 102 around hinge axis 116(1) and an equal rotation by second portion 104 around hinge axis 116(2) relative to line 402.

FIGS. 7A and 7B show further rotation of the device so that the device portions 102 and 104 are 300 degrees apart. Consistent with the discussion above, equal rotation occurs around each hinge axis 116 due to the self-regulating hinge assembly 106(1). Thus, first portion 102 has rotated 150 degrees around hinge axis 116(1) relative to line 402 and second portion 104 has rotated 150 degrees around hinge axis 116(2).

FIGS. 8A and 8B show complete rotation of this implementation to 360 degrees with the first and second surfaces 102 and 104 parallel to and facing away from one another. Note that other implementations can have other ranges of rotation besides 360 degrees. For instance, another implementation can have a range of rotation of 130 degrees while still another implementation has a range of rotation of 180 degrees, for example. Regardless, the self-regulating hinge assembly 106(1) can ensure corresponding rotation around the first and second hinge axes 116(1) and 116(2). Thus, when a user rotates the first and second portions toward and/or away from one another, the self-regulating hinge assembly can ensure that rotation around the first hinge axis corresponds to rotation around the second hinge axis. For instance, in this implementation the rotation can be performed equally around the first and second hinge axes 116(1) and 116(2). As such, if the user rotates the first and second portions back from the 360 degree orientation of FIGS. 8A and 8B, the self-regulating hinge assembly 106(1) can ensure equal and synchronized and simultaneous rotation around both hinge axes.

Figure 9A:
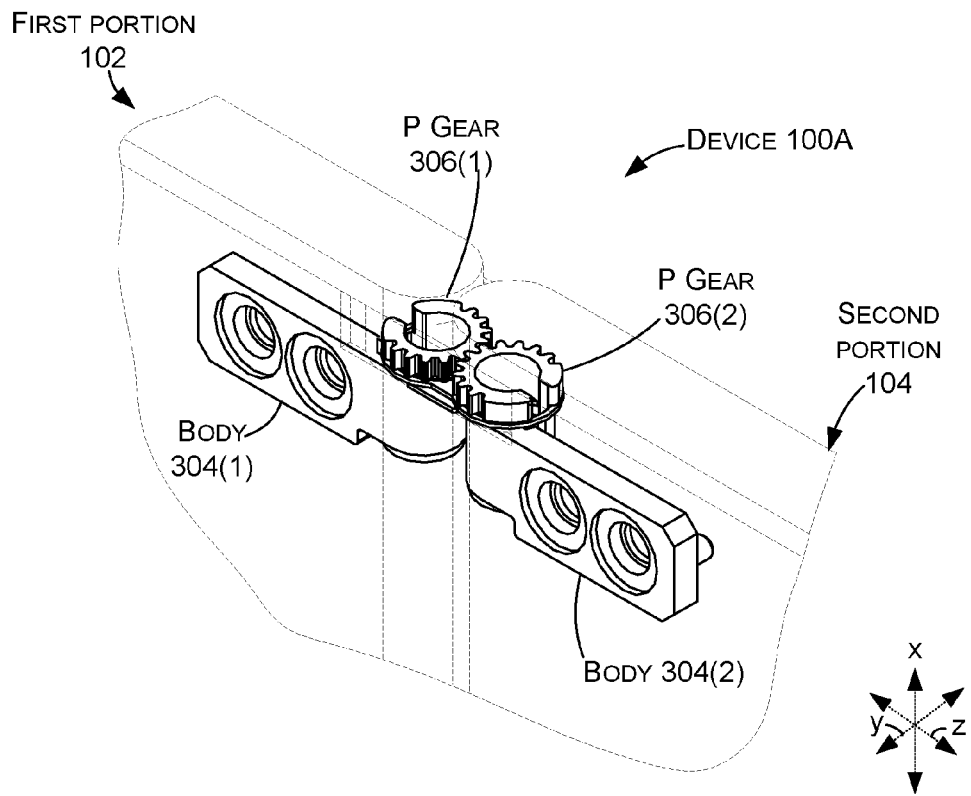
Figure 9B:
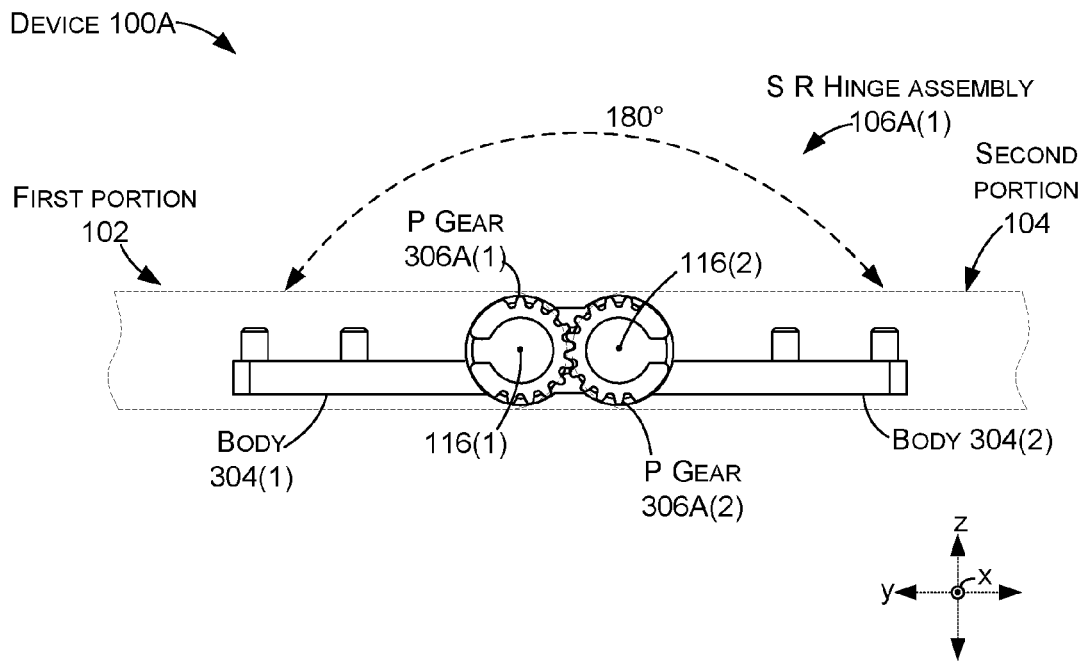
Figure 10A:
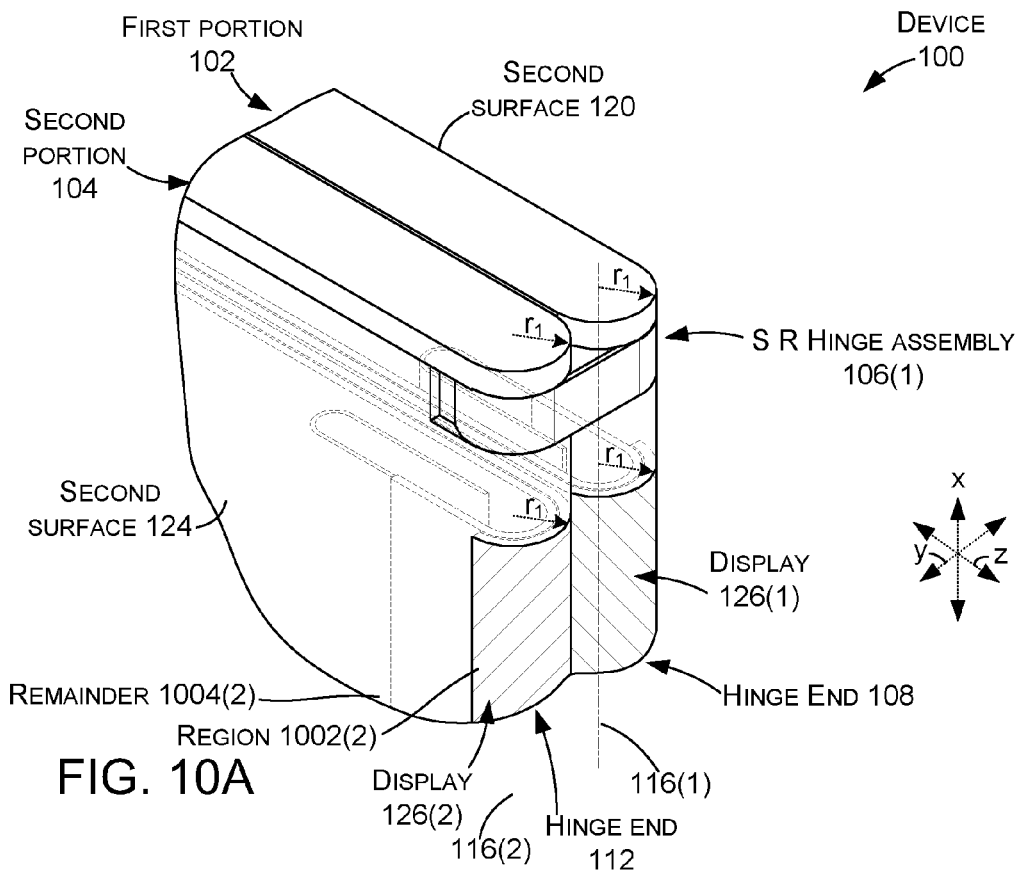
Figure 10B:
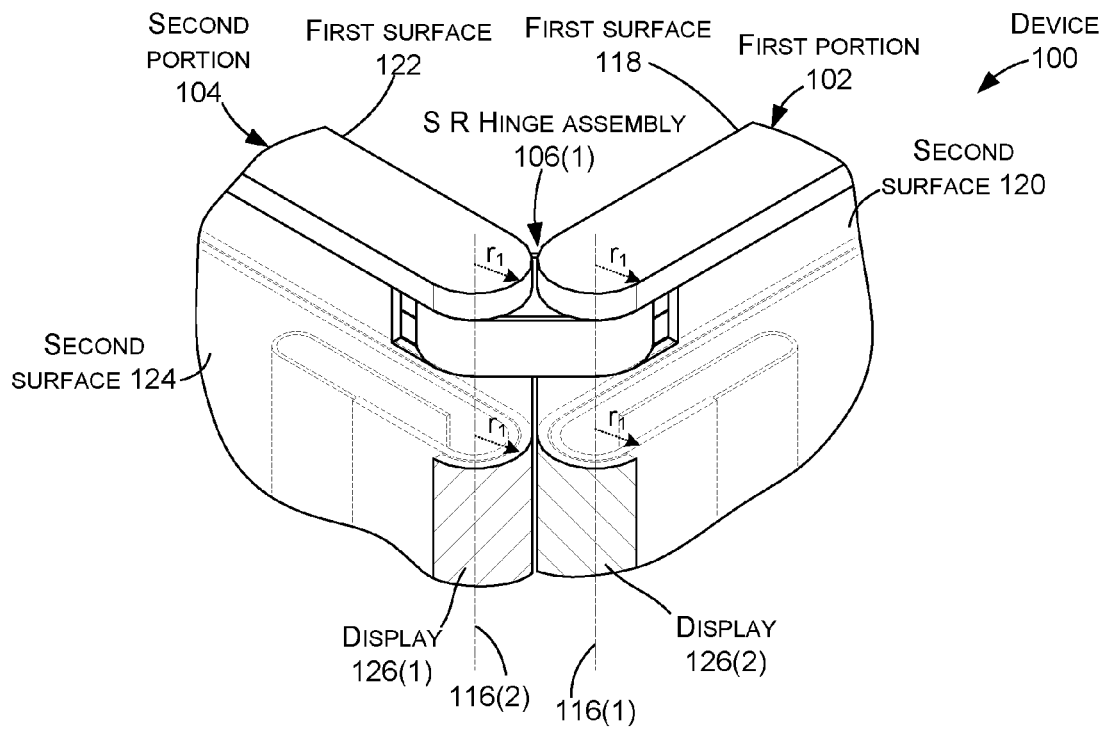

FIGS. 9A and 9B show another example self-regulating hinge assembly 106A(1) on device 100A. In this case, primary gears 306A are associated with their respective bodies 304A and rotate around hinge axes 116. In this example, the primary gears 306A(1) and 306A(2) directly engage one another to regulate rotation of first portion 102 around hinge axis 116(1) and second portion 104 around hinge axis 116(2).

FIGS. 10A-10E and 11 collectively show additional features of example device 100. In this implementation, displays 126(1) and 126(2) are positioned on first surfaces 118 and 122, respectively. Further, the displays wrap around the hinge ends 108 and 112 of the first and second portions 102 and 104 onto the second surfaces 120 and 124, respectively. In this case, the displays 126 wrap at the hinge ends along a curve (e.g. radius of curvature) that has the same profile as a profile of the self-regulating hinge assembly 106 when viewed along the axes of rotation. These profiles both have a radius $r_1$ relative to the hinge axes 116. Recall from the discussion of FIGS. 3A-3C above that the self-regulating hinge assembly 106(1), as defined by first and second bodies 304, can have this same curved or radiused profile represented by radius $r_1$. This shared radius can allow the first and second portions to be rotated relative to one another while maintaining a consistent and small gap G (designated on FIG. 11) between the first and second portions 102 and 104 at the self-regulating hinge assemblies 106 and between the displays 126(1) and 126(2) during the range of orientations.

In this implementation, the displays 126 are visible on the first surfaces 118 and 122. The displays then wraps around the hinge ends 108 and 112 to the second surfaces 120 and 124. In the illustrated implementation, on the second surfaces 120 and 124 a region 1002 of the display 126 are visible and a remainder or remaining region 1004 of the display is obscured. In other implementations, the displays can be visible across the second surfaces in a similar manner to the first surfaces. Having the displays visible as the displays curve around the hinge ends and on the second surfaces can allow content to be displayed and be visible to the user even when the first and second portions 102 and 104 are in the closed or in the zero degree orientation of FIG. 10A.

Figure 11:
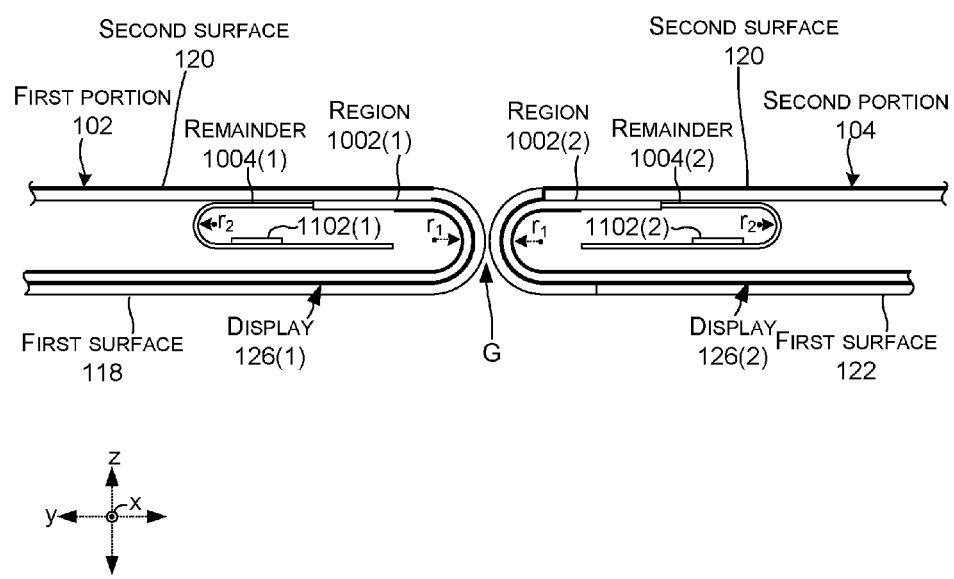
FIG. 11 shows an example sectional view of example devices in accordance with some implementations of the present concepts.

Further, in this implementation, as can be appreciated in FIG. 11, the displays 126 can include connectors 1102 on the remainder 1004 of the displays. The connectors can connect the displays to each other and/or to other components via conductors, such as flexible printed circuits that are connected to the connectors. This configuration can allow the displays to extend across more of the first surfaces and the hinge ends than would otherwise be possible (e.g., increased screen real estate) if the connectors occupied area of the first surface.

The illustrated implementation includes another radiused curve or radius of curvature ($r_2$) that is less than $r_1$ and extends between the first and second surfaces (118 and 120 and 122 and 124). This second radiused curve can provide a location for the connectors 1102 to be connected to the conductors without occupying real estate on the device that could otherwise be utilized for the displays to present content to the user.

Individual elements of the hinge assembly 106 can be made from various materials, such as metals, plastics, and/or composites. These materials can be prepared in various ways, such as in the form of sheet metals, die cast metals, machined metals, 3D printed materials, molded or 3D printed plastics, and/or molded or 3D printed composites, among others, or any combination of these materials and/or preparations can be employed.

The present hinge assembly concepts can be utilized with any type of device, such as but not limited to notebook computers, smart phones, wearable smart devices, tablets, and/or other types of existing, developing, and/or yet to be developed devices.

Various methods of manufacture, assembly, and/or use for hinge assemblies and devices are contemplated beyond those shown above relative to FIGS. 1-11.

Various device examples are described above. Additional examples are described below. One example includes a device comprising a first portion and a second portion. The device further comprises a pair of self-regulating hinge assemblies rotatably securing hinge ends of the first and second portions around a first hinge axis associated with the first portion and a second hinge axis associated with the second portion so that an extent of rotation around the first hinge axis corresponds to an extent of rotation around the second hinge axis. The device further comprises a first display positioned on the first portion and wrapped around the hinge end between the pair of hinge assemblies, and also comprises a second display positioned on the second portion and wrapped around the hinge end between the pair of hinge assemblies.

Another example can include any of the above and/or below examples where the first display is wrapped axially around the first hinge axis and the second display is wrapped axially around the second hinge axis.

Another example can include any of the above and/or below examples where the first display is wrapped axially around the first hinge axis at a first radius of curvature and the second display is wrapped 180 axially around the second hinge axis at the first radius of curvature.

Another example can include any of the above and/or below examples where beyond wrapping around the hinge end, the first display extends generally orthogonally away from the first hinge axis and then wraps back toward the first hinge axis at a second radius of curvature that is smaller than the first radius of curvature.

Another example can include any of the above and/or below examples where the pair of self-regulating hinge assemblies each comprise first and second friction cylinders through which individual hinge axes pass and where a curved profile of the friction cylinders matches a curved profile of the wrapped first and second displays.

Another example can include any of the above and/or below examples where the first friction cylinder is defined by a first body that is secured to the first portion and the second friction cylinder is defined by a second body that is secured to the second portion.

Another example can include any of the above and/or below examples where the pair of self-regulating hinge assemblies each include first and second hinge pins that reside within respective first and second friction cylinders.

Another example can include any of the above and/or below examples where the first and second hinge pins each include gears that provide timing of the self-regulating hinge assemblies.

Another example can include any of the above and/or below examples where the gears directly engage to provide the timing.

Another example can include any of the above and/or below examples where the device further comprises intervening gears and where the gears indirectly engage via the intervening gears to provide the timing.

Another example can include any of the above and/or below examples where the first and second hinge pins extend from a communication member.

Another example can include any of the above and/or below examples where the gears are rotatably retained in the communication member.

Another example can include any of the above and/or below examples where the communication member defines a passage between the first portion and the second portion and further comprising a flexible printed circuit positioned in the passage and electrically connecting components of the first portion to components of the second portion.

Another example can include any of the above and/or below examples where the components of the first portion comprise the first display and where the components of the second portion comprise the second display.

Another example can include a device comprising a first portion that includes a first display that is wrapped around a hinge end of the first portion and a second portion that includes a second display that is wrapped around a hinge end of the second portion. The device further comprises a pair of hinge assemblies rotatably securing the hinge ends of the first and second portions so that a gap between the hinge end of the first display and the hinge end of the second display remains constant during rotation of the first and second portions.

Another example can include any of the above and/or below examples where the pair of self-regulating hinge assemblies are timed so that the rotation occurs equally relative to the first and second portions.

Another example can include any of the above and/or below examples where the pair of self-regulating hinge assemblies are timed by gears.

Another example can include any of the above and/or below examples where the rotation occurs around either the first portion or the second portion.

Another example can include a device comprising a first portion that includes a first display that is wrapped in a radiused profile around a hinge end of the first portion and a second portion that includes a second display that is wrapped in a radiused profile around a hinge end of the second portion. The device further comprises a pair of hinge assemblies rotatably securing the hinge ends of the first and second portions with the first and second displays interposed therebetween and where the pair of hinge assemblies have radiused profiles that match the radiused profiles of the first and second displays.

Although techniques, methods, devices, systems, etc., pertaining to hinge assemblies are described in language specific to structural features and/or methodological acts, it is to be understood that the subject matter defined in the appended claims is not limited to the specific features or acts described. Rather, the specific features and acts are disclosed as example forms of implementing the claimed methods, devices, systems, etc.

The invention claimed is:

1. A device, comprising:
   a first portion and a second portion;
   a pair of self-regulating hinge assemblies rotatably securing hinge ends of the first and second portions around a first hinge axis associated with the first portion and a second hinge axis associated with the second portion so that an extent of rotation around the first hinge axis corresponds to an extent of rotation around the second hinge axis;
   a first display positioned on the first portion and wrapped around the hinge end between the pair of hinge assemblies; and,
   a second display positioned on the second portion and wrapped around the hinge end between the pair of self-regulating hinge assemblies.

2. The device of claim 1, wherein the first display is wrapped axially around the first hinge axis and the second display is wrapped axially around the second hinge axis.

3. The device of claim 2, wherein the first display is wrapped axially around the first hinge axis at a first radius of curvature and the second display is wrapped 180 axially around the second hinge axis at the first radius of curvature.

4. The device of claim 3, beyond wrapping around the hinge end, the first display extends generally orthogonally away from the first hinge axis and then wraps back toward the first hinge axis at a second radius of curvature that is smaller than the first radius of curvature.

5. The device of claim 2, wherein the pair of self-regulating hinge assemblies each comprise first and second friction cylinders through which individual hinge axes pass, and wherein a curved profile of the friction cylinders matches a curved profile of the wrapped first and second displays.

6. The device of claim 5, wherein the first friction cylinder is defined by a first body that is secured to the first portion and the second friction cylinder is defined by a second body that is secured to the second portion.

7. The device of claim 5, wherein the pair of self-regulating hinge assemblies each include first and second hinge pins that reside within respective first and second friction cylinders.

8. The device of claim 7, wherein the first and second hinge pins each include gears that provide timing of the self-regulating hinge assemblies.

9. The device of claim 8, wherein the gears directly engage to provide the timing.

10. The device of claim 8, further comprising intervening gears and wherein the gears indirectly engage via the intervening gears to provide the timing.

11. The device of claim 8, wherein the first and second hinge pins extend from a communication member.

12. The device of claim 11, wherein the gears are rotatably retained in the communication member.

13. The device of claim 11, wherein the communication member defines a passage between the first portion and the second portion and further comprising a flexible printed circuit positioned in the passage and electrically connecting components of the first portion to components of the second portion.

14. The device of claim 13, wherein the components of the first portion comprise the first display and wherein the components of the second portion comprise the second display.

15. A device, comprising:
   a first portion that includes a first display that is wrapped around a hinge end of the first portion;
   a second portion that includes a second display that is wrapped around a hinge end of the second portion; and,
   a pair of self-regulating hinge assemblies rotatably securing the hinge ends of the first and second portions so that a gap between the hinge end of the first display and the hinge end of the second display remains constant during rotation of the first and second portions.

16. The device of claim 15, wherein the pair of self-regulating hinge assemblies are timed so that the rotation occurs equally relative to the first and second portions.

17. The device of claim 16, wherein the pair of self-regulating hinge assemblies are timed so that the rotation occurs equally relative to the first and second portions.

18. The device of claim 17, wherein the pair of hinge assemblies are timed by gears.

19. The device of claim 15, wherein the rotation occurs around either the first portion or the second portion.

20. A device, comprising:
- a first portion that includes a first display that is wrapped in a radiused profile around a hinge end of the first portion;
- a second portion that includes a second display that is wrapped in a radiused profile around a hinge end of the second portion; and,
- a pair of self-regulating hinge assemblies rotatably securing the hinge ends of the first and second portions with the first and second displays interposed therebetween, and wherein the pair of self-regulating hinge assemblies have radiused profiles that match the radiused profiles of the first and second displays.

* * * * *